United States Patent
Ikeda

(10) Patent No.: US 9,110,842 B2
(45) Date of Patent: Aug. 18, 2015

(54) CONTROL DEVICE FOR VEHICLE AND ERROR PROCESSING METHOD IN CONTROL DEVICE FOR VEHICLE

(71) Applicant: HITACHI AUTOMOTIVE SYSTEMS, LTD., Hitachinaka-shi, Ibaraki (JP)

(72) Inventor: Yoshinori Ikeda, Isesaki (JP)

(73) Assignee: HITACHI AUTOMOTIVE SYSTEMS, LTD., Hitachinaka-shi (JP)

( * ) Notice: Subject to any disclaimer, the term of this patent is extended or adjusted under 35 U.S.C. 154(b) by 187 days.

(21) Appl. No.: 13/845,977

(22) Filed: Mar. 18, 2013

(65) Prior Publication Data

US 2014/0047299 A1 Feb. 13, 2014

(30) Foreign Application Priority Data

Aug. 10, 2012 (JP) .................................. 2012-177995

(51) Int. Cl.

| | |
|---|---|
| G06F 11/00 | (2006.01) |
| G06F 11/14 | (2006.01) |
| G06F 12/02 | (2006.01) |
| G06F 12/16 | (2006.01) |
| G06F 11/30 | (2006.01) |
| G06F 11/10 | (2006.01) |

(52) U.S. Cl.
CPC ........ *G06F 11/1412* (2013.01); *G06F 11/1048* (2013.01); *G06F 11/30* (2013.01); *G06F 12/02* (2013.01); *G06F 12/16* (2013.01)

(58) Field of Classification Search
CPC ...... G06F 11/1412; G06F 12/02; G06F 12/16
USPC .......................................................... 714/746
See application file for complete search history.

(56) References Cited

U.S. PATENT DOCUMENTS

| | | | | |
|---|---|---|---|---|
| 5,265,468 | A | * | 11/1993 | Holst et al. .................. 73/115.01 |
| 5,737,961 | A | * | 4/1998 | Hanisko et al. ................ 73/1.38 |
| 5,749,059 | A | * | 5/1998 | Walton ............................ 701/45 |
| 5,896,083 | A | * | 4/1999 | Weisman et al. ............. 340/438 |
| 6,347,272 | B2 | * | 2/2002 | Flammersfeld et al. ........ 701/93 |
| 6,629,022 | B1 | * | 9/2003 | Gessner et al. .................... 701/1 |
| 7,321,959 | B2 | | 1/2008 | Honda et al. |
| 7,934,050 | B2 | * | 4/2011 | Kamiya et al. ................ 711/103 |
| 8,010,872 | B2 | * | 8/2011 | Hashimoto et al. ........... 714/763 |
| 8,522,607 | B2 | * | 9/2013 | Grossmann et al. ....... 73/114.36 |
| 2005/0013154 | A1 | | 1/2005 | Honda et al. |

FOREIGN PATENT DOCUMENTS

WO WO 2004/031966 A1 4/2004

* cited by examiner

*Primary Examiner* — Esaw Abraham
(74) *Attorney, Agent, or Firm* — Foley & Lardner LLP

(57) ABSTRACT

A control device for a vehicle including a nonvolatile memory which is electrically erasable and writable detects, on start-up, whether or not an error occurs in updated data read from the nonvolatile memory, and when an error has been detected, performs a reset after saving error information. When being restarted by the reset, the control device for a vehicle determines on the basis of the error information whether or not there is updated data in which an error has occurred, and when there is updated data in which an error has occurred, overwrites the updated data with a fixed value prior to the error detection. Accordingly, there can be suppressed a case in which the error detection is performed while the updated data with an abnormality is present causing the reset and the error detection to be repeated.

20 Claims, 6 Drawing Sheets

FIG. 2

| ADDRESS | STORED DATA AREA | | | | ERROR CORRECTION CODE |
|---|---|---|---|---|---|
| 0000H | FIXED DATA A1 | A2 | A3 | A4 | CODE FOR A1 TO A4 |
| ....... | ....... | | | | |
| 8000H | UPDATED DATA B1 | B2 | B3 | B4 | CODE FOR B1 TO B4 |
| ....... | ....... | | | | |
| 9000H | FIXED DATA C1 | C2 | C3 | C4 | CODE FOR C1 TO C4 |
| ....... | ....... | | | | |

CONTROL DEVICE FOR VEHICLE AND ERROR PROCESSING METHOD IN CONTROL DEVICE FOR VEHICLE

BACKGROUND OF THE INVENTION

1. Field of the Invention

The present invention relates to a control device for a vehicle including a nonvolatile memory which is electrically erasable and writable, and an error processing method in the control device for a vehicle.

2. Description of Related Art

WO 2004/031966 A discloses a method of controlling a nonvolatile memory when writing data into a nonvolatile memory including a plurality of physical blocks, the method including steps of: writing a fixed value into a first flag which is in a redundant area on a forefront page of the physical block and indicates whether or not data is written on the forefront page, the fixed value indicating that the data is written; and writing data into the physical block.

There is a problem that occurs in a control device for a vehicle which detects, on start-up, an error in the data written in the nonvolatile memory.

That is, when an abnormality due to power shutdown or the like occurs while writing data into the nonvolatile memory, the device would be reset without the error data being rewritten, thereby causing the error detection and the reset to be repeated and causing a system to not operate normally.

SUMMARY OF THE INVENTION

Accordingly, an object of the present invention is to provide a control device for a vehicle and an error processing method in the control device for a vehicle, the device and the method being capable of suppressing a failure caused when there is an abnormality in writing updated data into the nonvolatile memory.

In order to achieve the aforementioned object, the control device for a vehicle according to the present invention includes:

an error detection unit which detects whether or not, on start-up, an error occurs in updated data in the nonvolatile memory; a reset unit which performs a reset when the error is detected by the error detection unit; and a rewrite unit which rewrites, when the device is restarted by the reset, the updated data in which the error has occurred with a predetermined value before the error is detected by the error detection unit.

Moreover, the error processing method in the control device for a vehicle according to the present invention includes:

determining, on start-up, whether or not there is a history of detecting an error in updated data in the nonvolatile memory; detecting whether or not an error occurs in the updated data in the nonvolatile memory when there is no history of detecting the error; when there is a history of detecting the error, detecting an error occurs in the updated data in the nonvolatile memory after rewriting the updated data in which the error has occurred with the predetermined value; and resetting the control device for a vehicle when an error is detected in the updated data.

Other objects and features of aspects of this invention will be understood from the following description with reference to the accompanying drawings.

BRIEF DESCRIPTION OF THE DRAWINGS

FIG. 2 is a diagram illustrating an address space of a nonvolatile memory in the embodiment of the present invention;

DESCRIPTION OF THE PREFERRED EMBODIMENTS

Figure 1:
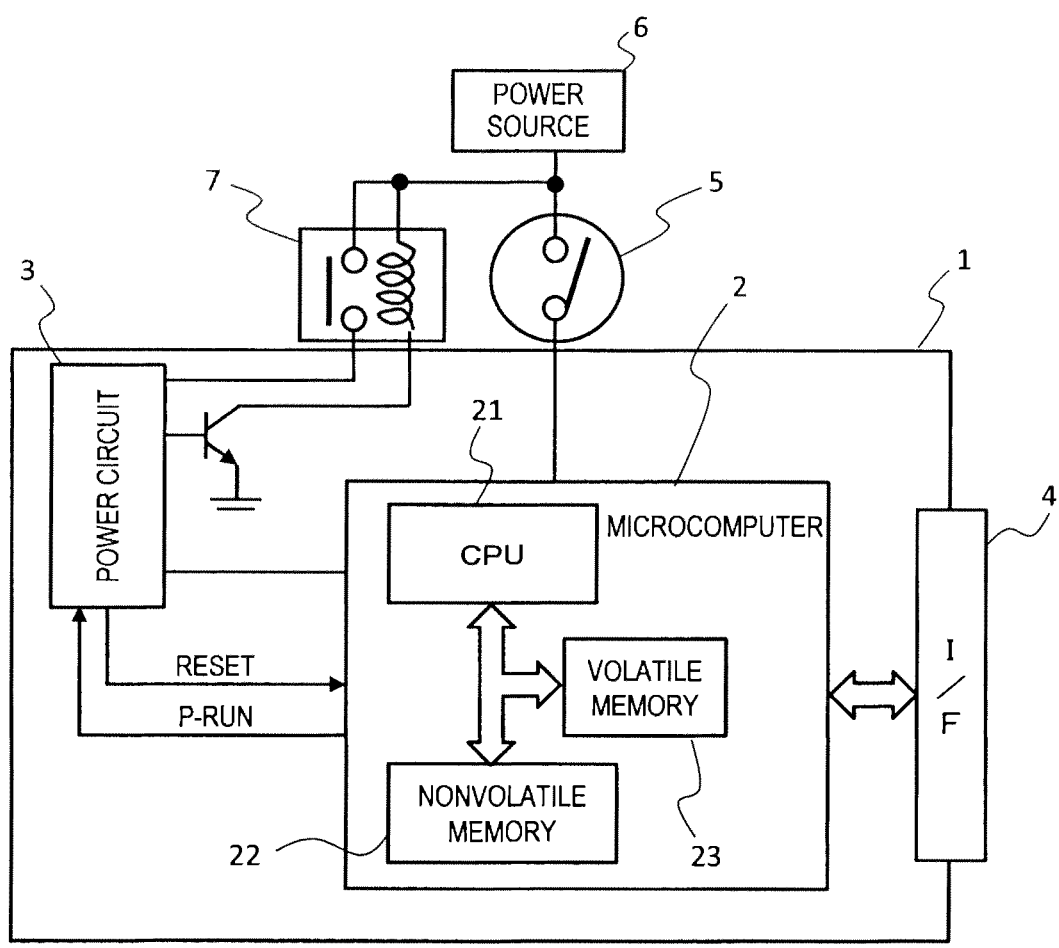
FIG. 1 is a block diagram of a control device for a vehicle in an embodiment of the present invention.

FIG. 1 is a block diagram illustrating an example of a control device for a vehicle according to the present invention.

A control device for a vehicle 1 as illustrated in FIG. 1 controls equipment such as an engine, an automatic transmission, and an air conditioner mounted in a vehicle and includes a microcomputer 2 serving as a computing unit, a power circuit 3, an I/F circuit 4 and the like.

Microcomputer 2 includes a CPU 21 serving as a processing unit, a nonvolatile memory 22 such as a flash ROM and an EEPROM which are electrically erasable and writable, and a volatile memory 23 such as a RAM.

Moreover, a sensor signal or the like is input to microcomputer 2 from the outside via I/F circuit 4, while an operation signal or the like is output from microcomputer 2 to the outside via I/F circuit 4.

A power source 6 such as a battery supplies power to microcomputer 2 and power circuit 3 via a power switch 5 which is turned on and off by a driver.

The power from power source 6 is also supplied to microcomputer 2 and power circuit 3 by a circuit through a self shut-off relay 7 controlled to be turned on and off by power circuit 3. As a result, the power can be continuously supplied to microcomputer 2 by keeping self shut-off relay 7 on after power switch 5 is turned off.

Moreover, power circuit 3 functions as a monitoring circuit to which a program run signal P-RUN is input from microcomputer 2 and from which a reset signal is output to microcomputer 2.

As illustrated in FIG. 2, an error correction code ECC that is a code for detecting and correcting a bit error for each or a plurality of stored data is stored in nonvolatile memory 22.

In FIG. 2, updated data represents data updated by learning control or data indicating a result of abnormality diagnosis, whereas fixed data represents data that is not updated such as a control parameter written at an initial state.

Figure 3:
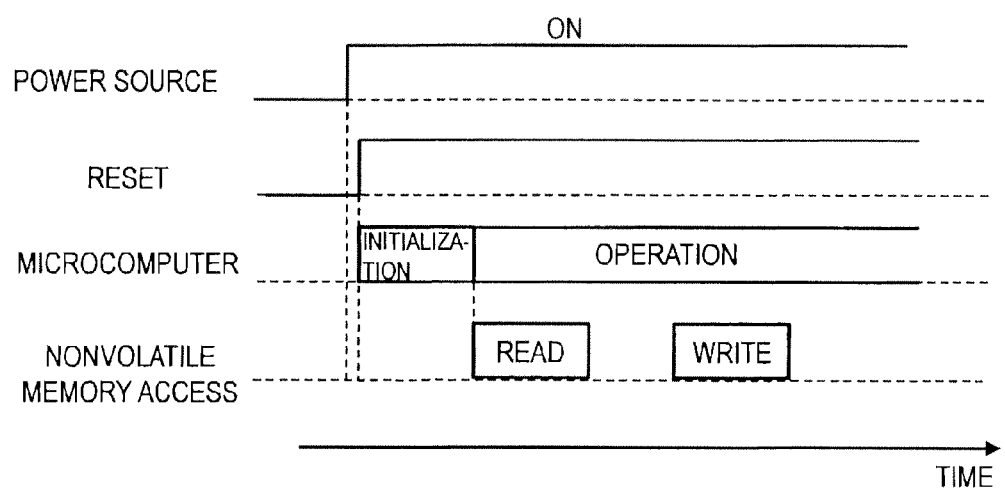
FIG. 3 is a timing diagram illustrating a process performed on start-up of the control device for a vehicle in the embodiment of the present invention.

As illustrated in FIG. 3, microcomputer 2 is powered on and started, first, perform an initialization process, and then, detect an error by reading updated data from nonvolatile memory 22, and subsequently perform a process of writing the updated data or the like.

The updated data is written into nonvolatile memory 22 as needed after detecting, and the error and is written at a random timing.

An example of error processing performed on the updated data by microcomputer 2 will be described below by following a flowchart in FIG. 4.

The initialization is performed in step S101 immediately after microcomputer 2 is powered on, started after the reset release.

After the initialization, the process proceeds to step S102 in which error information indicating the result of error detection in the updated data is read, the error detection being performed at the time of the previous start-up.

As will hereinafter be described, microcomputer 2 saves the result of the error detection as the error information in nonvolatile memory 22 or volatile memory 23 every time the error detection is performed on the updated data, the error information being read in step S102.

In step S103, it is determined on the basis of the error information whether or not there is a history of detecting an error in the updated data, in other words, whether or not an error was detected in the updated data during the error detection performed at the time of the previous start-up.

When there is no history of detecting the error in the updated data, that is, when there was no updated data from which the error was detected during the error detection performed at the previous start-up, step S104 is bypassed so that the error detection in step S105 and the subsequent steps is performed.

In step S105, the updated data and error correction code ECC are read from nonvolatile memory 22.

In step S106, the updated data is collated with error correction code ECC.

When the result of the collation indicates no abnormality, the process proceeds to step S109 in which it is determined whether or not all the updated data have been read. When all the updated data have not been read, the process returns to step S105 in which next updated data and error correction code ECC are read. When all the updated data have been read, the process proceeds to step S110 in which another process is performed.

On the other hand, the process proceeds to step S107 when the result of the collation in step S106 indicates an abnormality.

The error detection can be performed by a known method such as a parity check and a checksum.

An error in the updated data occurs when, for example, the power supply for microcomputer 2 is interrupted while the updated data is being written into nonvolatile memory 22.

When power switch 5 is turned off while the updated data is being written, the updated data and error correction code ECC can be written normally by continuously supplying power to microcomputer 2 via self shut-off relay 7 until the writing operation is completed.

Moreover, an on and off signal for power switch 5 is input to microcomputer 2 to which power is supplied from an external power source via relay 7 at the same time so that, when power switch 5 is turned off while the updated data is being written into nonvolatile memory 22, relay 7 can be kept on until the writing operation is completed and turned off after the writing operation is completed.

However, when a power supply voltage decreases during the writing operation of the updated data due to disconnection or a ground fault of a harness which supplies power to microcomputer 2, fall-out of a connector provided to the harness, or a power failure, there occurs an error that a value which has actually been written is different from a value expected to be written or that a value before the update is left in nonvolatile memory 22.

In step S107, it is determined whether or not the error in the updated data is a bit error that can be corrected.

When a 1-bit error can be corrected by horizontal and vertical parity, for example, it is determined in step S107 whether or not the abnormality in the updated data is the 1-bit error.

When the abnormality in the updated data is the 1-bit error that can be corrected, the process proceeds to step S108 in which the updated data is corrected and thereafter proceeds to step S109.

It is determined that correction cannot be made when there is a 2-bit error or more, in which case the process proceeds to step S111 in which an address or the like of the updated data in which the error has occurred is saved in nonvolatile memory 22.

Subsequently, a shutdown process is performed in step S112 followed by step S113 in which the output of program run signal P-RUN is discontinued.

Power circuit 3 which monitors program run signal P-RUN output from microcomputer 2 outputs a reset signal to reset microcomputer 2 when program run signal P-RUN is discontinued.

Microcomputer 2 to which the reset signal has been input performs a reset process in step S114 and is restarted to perform the initialization again in step S101 and proceed to step S102 thereafter.

Note that microcomputer 2 itself can perform the reset when having detected the error in the updated data.

In step S102, the error information on the updated data saved by the error detection performed at the time of the previous start-up is read.

In step S103, it is determined that there is a history of detecting the error in the updated data, whereby the process proceeds to step S104.

In step S104, the updated data being a fixed value as well as error correction code ECC calculated in the write process are overwritten in all areas of the updated data, so that all the updated data including the updated data from which the error has been detected are rewritten with a fixed value.

The fixed value is saved beforehand in nonvolatile memory 22 and exists as a combination of the updated data from which an error is not detected and error correction code ECC.

When the updated data is a type of data that is updated by learning control, the fixed value can be set as a default value for the learning control.

The fixed value can also be set for each address of each updated data and be overwritten with a fixed value corresponding to each address.

By rewriting all the updated data, including the updated data from which the error has been detected, with a predetermined value and rewriting error correction code ECC, there can be avoided a case in which the error is detected in the updated data in the error detection performed in step S105 and subsequent steps, thereby allowing the process to proceed to step S110 eventually and control device for a vehicle 1 to start controlling the equipment.

Without each of steps S103 and S104, the error remaining unresolved would be detected again when the device is reset upon detecting the error in the updated data.

As a result, the reset and the error detection would be repeated in which control device for a vehicle 1 cannot start controlling the equipment, thereby causing the system using control device for a vehicle 1 to not operate.

In such state in which it is difficult to enable the system to start in a normal method, there would be required a replacement of control device for a vehicle 1 or rewriting of software for control device for a vehicle 1.

In contrast, when each of steps S103 and S104 is provided, the result of the previous error detection is stored so that, when the error has been detected in the updated data in the previous error detection, the updated data in which the error has occurred can be rewritten prior to the present error detection in order to prevent the error from being detected. Control device for a vehicle 1 can therefore start the control without the reset and the error detection being repeated. At the same time, control device for a vehicle 1 would not be replaced unnecessarily, or there would be no need to rewrite the software for control device for a vehicle 1.

The error detection can also be performed on the fixed data along with the updated data so that the device can be reset when the error is detected in the fixed data because an error in the fixed data can cause the control to be unnecessary.

Figure 4:
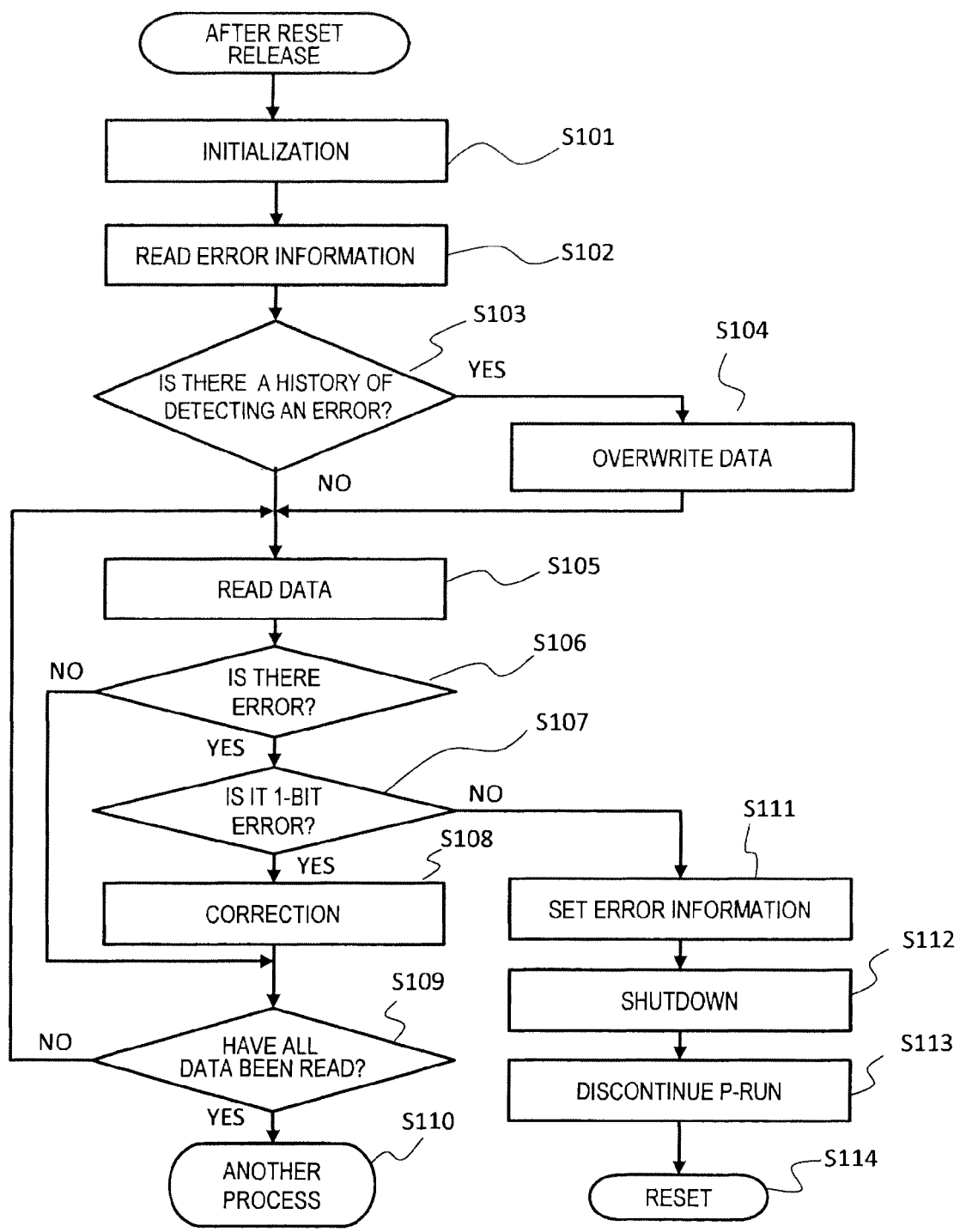
FIG. 4 is a flowchart illustrating an example of a process performed on start-up of the control device for a vehicle in the embodiment of the present invention.

In the process illustrated in the flowchart in FIG. 4, all the updated data including normal updated data are rewritten with the fixed value after the device is reset and restarted, in the case in which an error has occurred in a part of the updated data. The rewriting can however be limitedly performed on the updated data having the address in which the error has occurred.

Figure 5:
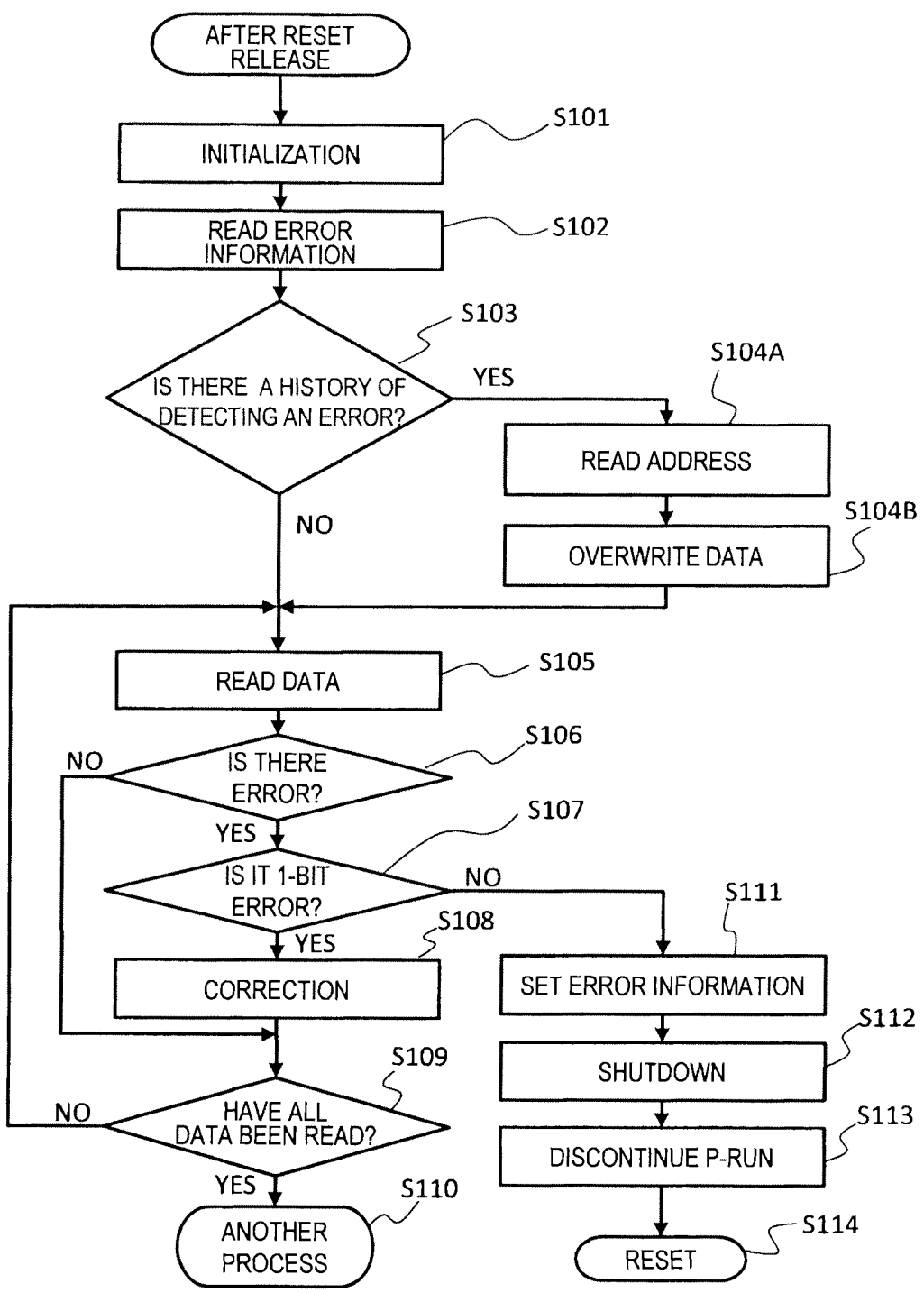
FIG. 5 is a flowchart illustrating an example of a process performed on start-up of the control device for a vehicle in the embodiment of the present invention.

The flowchart in FIG. 5 illustrates the flow of a process performed by microcomputer 2 in which the fixed value is written to the updated data having the address in which the error has been detected.

In the flowchart illustrated in FIG. 5, a step performing the same process as that in the flowchart in FIG. 4 is assigned the same step number as that in FIG. 4, while steps S104A and S104B that are different from those in the flowchart in FIG. 4 will be described. The explanation of the other steps will be omitted.

When it is determined that there is a history of detecting an error in the updated data in step S103, the process proceeds to step S104A in which the address of the updated data from which the error has been detected is read, the address being stored as the error information.

In step S104B, the updated data having the address read in step S104A is rewritten with the fixed value, and error correction code ECC is rewritten with the one calculated in the writing process.

That is, among the plurality of updated data in an updated data area, the updated data in which the error has occurred is rewritten whereas the updated data in which no error has occurred is left as is without being overwritten.

The fixed value overwritten in the updated data is saved beforehand in nonvolatile memory 22 and can be set to a uniform value regardless of the address to be overwritten or set to a different value according to the address to be overwritten.

As described above, at the time the device is reset and restarted by the error detection, the updated data having the address in which the error has been detected is rewritten with the fixed value to avoid error detection prior to the error detection to be performed. As a result, control device for a vehicle 1 can start controlling the equipment without the reset and the error detection being repeated.

Moreover, the updated data which has been written normally can be saved as is by only overwriting the updated data having the address from which the error has been detected with the fixed value. This means that it may be not required to redo the learning control from the initial state when the updated data is the type of data updated by the learning control, for example.

When mirroring is performed in which the identical updated data is written in each of a plurality of areas at the time of writing the updated data in nonvolatile memory 22, there is a case in which the identical updated data is written normally in the areas except an area in which the error has occurred in the updated data.

In this case, a correct value for the updated data in which the error has occurred is saved in the other areas, so that the value saved in the other areas can be used to overwrite the updated data in which the error has occurred.

Figure 6:
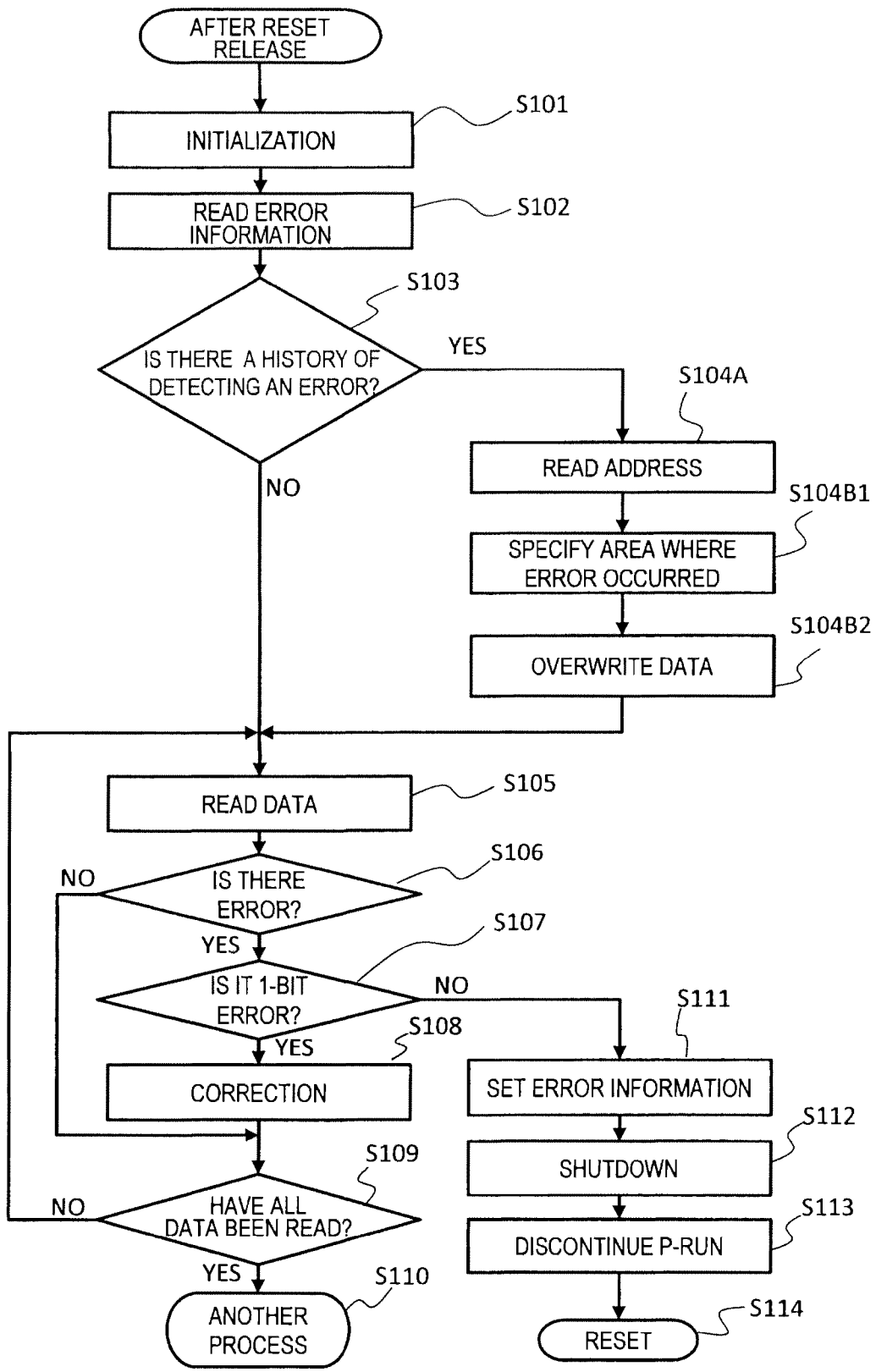
FIG. 6 is a flowchart illustrating an example of a process performed on start-up of the control device for a vehicle in the embodiment of the present invention.

An example of the overwrite process will be described by following a flowchart in FIG. 6.

In the flowchart illustrated in FIG. 6, a step performing the same process as that in the flowchart in FIG. 4 is assigned the same step number as that in FIG. 4, while steps S104A, S104B1 and S104B2 that are different from those in the flowchart in FIG. 4 will be described in detail. The explanation of the other steps will be omitted.

When it is determined that there is a history of detecting an error in the updated data in step S103, the process proceeds to step S104A in which the address of the updated data from which the error has been detected is read, the address being stored as the error information.

In step S104B1, an area including the address read in step S104A is detected from among the plurality of areas in which the identical updated data is written by the mirroring.

In step S104B2, the data in the area in which the error has occurred among the plurality of areas in which the identical updated data is written by the mirroring is overwritten with the data in the area in which no error has occurred.

In this case, the data in the address from which the error has been detected can be overwritten with the updated data written in the address storing the identical updated data in another area and with a value of error correction code ECC calculated in the writing process. Moreover, all data in the area including the address in which the error has been detected can be overwritten with data in an area not including the address in which the error has been detected.

As described above, at the time the device is reset and restarted, the updated data having the address in which the error has occurred is overwritten with the corresponding updated data value in the other area prior to the error detection. As a result, the error would not be detected in the subsequent error detection, so that control device for a vehicle 1 can start controlling the equipment without the reset and the error detection being repeated.

Moreover, the updated data in which the error has occurred is overwritten with the correct value written in the other area, thereby restoring the same state as where no error has occurred in writing the updated data. Therefore, when the updated data is the type of data updated by the learning control, for example, it may be not required to redo the learning control from the initial state so that the device can perform the control by reflecting the learning result obtained up to that time.

The entire contents of Japanese Patent Application No. 2012-177995, filed Aug. 10, 2012, are incorporated herein by reference.

While only a select embodiment has been chosen to illustrate the present invention, it will be apparent to those skilled in the art from this disclosure that various changes and modifications can be made herein without departing from the scope of the invention as defined in the appended claims.

Furthermore, the foregoing description of the embodiment according to the present invention is provided for illustration only, and not for the purpose of limiting the invention, the invention as claimed in the appended claims and their equivalents.

What is claimed is:

1. A control device for a vehicle comprising:
   a nonvolatile memory which is electrically erasable and writable;
   an error detection unit which detects, on start-up, whether an error has occurred in updated data in the nonvolatile memory;
   a reset unit which performs a reset when an error is detected by the error detection unit; and
   a rewrite unit which rewrites, when the control device is restarted by the reset, updated data in which the error has occurred with a predetermined value that is determined prior to error detection by the error detection unit.

2. The control device for a vehicle according to claim 1, wherein the error detection unit saves an address of the updated data in which the error has been detected, and the rewrite unit rewrites the updated data with the predetermined value on the basis of the address.

3. The control device for a vehicle according to claim 1, further comprising a write unit which writes identical updated data to a plurality of areas in the nonvolatile memory, wherein the rewrite unit rewrites, when the device is restarted by the reset, the updated data in an area in which the error has occurred with updated data in another area in which the identical updated data is written.

4. The control device for a vehicle according to claim 1, wherein the reset unit includes:
   a program run signal output unit which discontinues output of a program run signal when the error is detected in the updated data; and
   a reset signal output unit which outputs a reset signal when the output of the program run signal from the program run signal output unit is discontinued.

5. The control device for a vehicle according to claim 1, wherein:
   a microcomputer comprises the reset unit, the error detection unit, and the rewrite unit, and
   the microcomputer resets itself upon detecting an error in the updated data.

6. The control device for a vehicle according to claim 1, further comprising:
   a first circuit which receives power supplied from an external power source via a power switch;
   a second circuit which receives power supplied from the external power source by bypassing the power switch;
   a relay provided to the second circuit; and
   a power source control unit which receives power supplied from the second circuit when the power switch is turned off while updated data is being written in the nonvolatile memory, and which turns off the relay when the writing is completed to perform self shut-off.

7. The control device for a vehicle according to claim 1, wherein the reset unit performs a reset when an error which cannot be corrected has occurred in the updated data.

8. The control device for a vehicle according to claim 1, wherein the rewrite unit further rewrites an error correction code written in the nonvolatile memory with a predetermined value.

9. The control device for a vehicle according to claim 1, wherein the rewrite unit overwrites all areas of the nonvolatile memory in which the updated data is stored with a predetermined value.

10. The control device for a vehicle according to claim 1, wherein the rewrite unit rewrites the updated data with a value different for each address.

11. The control device for a vehicle according to claim 1, wherein the rewrite unit rewrites the updated data with a fixed value.

12. The control device for a vehicle according to claim 1, wherein the error detection unit detects whether an error has occurred by collating updated data stored in the nonvolatile memory with an error correction code of the updated data.

13. The control device for a vehicle according to claim 1, wherein the reset unit performs a reset after saving error information when an error is detected.

14. The control device for a vehicle according to claim 1, wherein the updated data is a type of data which is updated by learning control.

15. A control device for a vehicle comprising:
   a nonvolatile memory which is electrically erasable and writable;
   error detection means for detecting, on start-up, whether an error has occurred in updated data in the nonvolatile memory;
   reset means for performing a reset when an error is detected by the error detection means; and
   rewrite means for rewriting, when the control device is restarted by the reset, updated data in which the error has occurred with a predetermined value that is determined prior to error detection by the error detection means.

16. An error processing method performed in a control device for a vehicle including a nonvolatile memory which is electrically erasable and writable, the method comprising:
   determining on start-up whether there is a history of detecting an error in updated data in the nonvolatile memory;
   detecting, when the history is absent, whether an error has occurred in the updated data in the nonvolatile memory;
   rewriting, when the history is present, the updated data in which the error has occurred with a predetermined value and subsequently detecting whether an error has occurred in the updated data in the nonvolatile memory; and
   resetting the control device for the vehicle when an error is detected in the updated data.

17. The error processing method performed in a control device for a vehicle according to claim 16, wherein resetting the control device for the vehicle includes:
   saving an address of the updated data in which an error has been detected; and
   resetting the control device for the vehicle after saving the address.

18. The error processing method performed in a control device for a vehicle according to claim 16, further comprising writing identical updated data to a plurality of areas in the nonvolatile memory,
   wherein rewriting the updated data in which the error has occurred with the predetermined value includes: rewriting the updated data in which the error has occurred with updated data in another area in which the identical updated data is written.

19. The error processing method performed in a control device for a vehicle according to claim 16,
   wherein detecting whether an error has occurred in the updated data includes detecting whether an error has occurred by collating updated data stored in the nonvolatile memory with an error correction code of the updated data.

20. The error processing method performed in a control device for a vehicle according to claim 19,
   wherein rewriting the updated data in which the error has occurred with the predetermined value further includes rewriting an error correction code written in the nonvolatile memory with a predetermined value.

* * * * *